United States Patent [19]

Speich

[11] Patent Number: 5,154,516
[45] Date of Patent: Oct. 13, 1992

[54] PIVOT MECHANISM INCORPORATING MEANS TO TAKE UP WEAR BETWEEN TWO PARTS THEREOF

[75] Inventor: Gerald A. Speich, Warwickshire, England

[73] Assignee: The Torrington Company, Torrington, Conn.

[21] Appl. No.: 696,141

[22] Filed: May 6, 1991

[30] Foreign Application Priority Data

May 8, 1990 [GB] United Kingdom ............... 9010303
Apr. 12, 1991 [GB] United Kingdom ............... 9107762

[51] Int. Cl.⁵ .......................................... F16C 17/10
[52] U.S. Cl. ................................. 384/202; 384/204
[58] Field of Search ............. 384/202, 203, 204, 215, 384/206, 209

[56] References Cited

U.S. PATENT DOCUMENTS 4,879,785 11/1989 Tölle et al. ........................ 16/82

FOREIGN PATENT DOCUMENTS

WO80/02447 11/1980 PCT Int'l Appl. .
608913 9/1948 United Kingdom .
1415675 11/1975 United Kingdom .
1570562 7/1980 United Kingdom .

Primary Examiner—Lenard A. Footland
Attorney, Agent, or Firm—Michael H. Minns

[57] ABSTRACT

A self-adjusting pivot mechanism for a car steering column arranged to take up wear and backlash, the mechanism including a housing bracket 9 for receiving a steering column 10, the housing having opposed symmetrical tapered trunnions 9A received in corresponding female tapered portions 11A of housing support brackets 11. The male and female tapered portions are resiliently urged towards one another by means of sprag washers 12 secured on extremities of the tapered portions 11A, which washers draw the parts 9A and 11A towards one another. Relative rotational movement between the portions 9A and 11A is accommodated.

20 Claims, 1 Drawing Sheet

PIVOT MECHANISM INCORPORATING MEANS TO TAKE UP WEAR BETWEEN TWO PARTS THEREOF

BACKGROUND OF THE INVENTION

This invention relates to a pivot mechanism incorporating means to take up wear between two parts thereof.

The invention has particular relevance to car steering columns where historically there has been a problem of how to allow systems such as oar steering columns to pivot, giving positional adjustment, without introducing noticeable backlash or free play into that system, whether that be wear or tolerance induced. FIG. 1 illustrates a simplified arrangement of a car steering column 10 with a steering wheel 1, with the steering wheel movement being illustrated by the arrows A. Reference numeral 2 illustrates a pivot mechanism.

Common systems in use today tend to accept looseness and ignore the results, which leads to a poor user response, or alternatively introduce a multitude of plastics and rubber parts to absorb clearances and damp out movement. These can be difficult to assemble and are prone to mishandling.

As a result of the former problems, FIG. 2 illustrates a housing 3 or the like, with a bolt 4 or the like intended to secure a mounting bracket 5. Such a construction leads to an inherent clearance illustrated by way of example at 6.

FIG. 3 illustrates the tendency to introduce a multitude of plastics and rubber parts and here it will be seen that the mounting bracket 5 is secured between the housing 3 and bolt 4 with the addition of a plastic washer 16 on one side of it and an O-ring 7 and a "top hat" washer 8 on the other side of it.

The foregoing illustrates limitations known to exist in present steering column pivot mechanisms. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a pivot mechanism having means to take up wear between two parts of the mechanism. The means has a male tapered part which nests in a corresponding female part. One of the two parts is resiliently biased towards the other.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

According to the present invention, there is provided a pivot mechanism incorporating means to take up wear between two parts of the mechanism which move relatively to one another, said means including a male tapered part nesting in a corresponding female part, one of the two parts being resiliently loaded towards the other.

Figure 1:
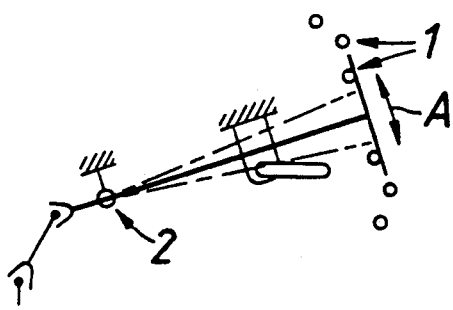
FIG. 1 is a simplified view illustrating a car steering column with pivot mechanism.
Figure 2:
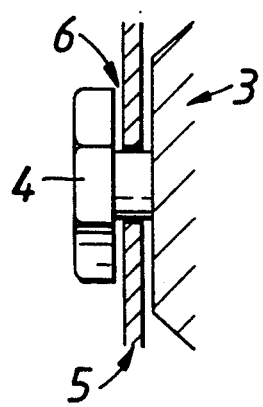
FIG. 2 is a cross-section view of a prior art pivot mechanism.
Figure 3:
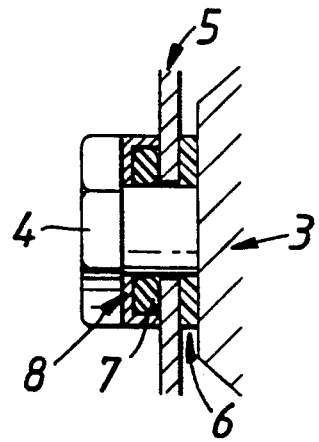
FIG. 3 is a cross-section view of a second prior art pivot mechanism.
Figure 4:
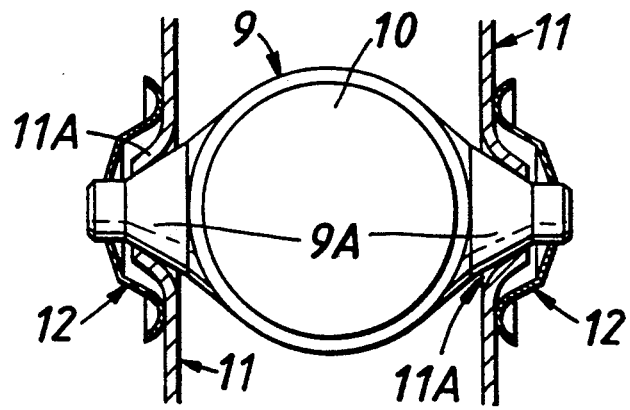
FIG. 4 is a cross-section view illustrating an embodiment of a pivot mechanism incorporating means to take up wear between two parts thereof.

Referring to FIG. 4 of the drawing, a substantially cylindrical housing 9 surrounds and locates a shaft 10 such as a steering column shaft or a bearing or the like for such a shaft.

The housing 9 forms part of a pivot mechanism incorporating means to take up wear between two parts of the mechanism which move relatively to one another and, in the example illustrated, this means is duplicated.

The housing 9 is provided with two symmetrically-opposed frusto conical male parts in the form of tapered trunnions 9A which are located in corresponding female tapered parts 11A of respective housing support brackets 11.

The external tapered surfaces of the trunnions 9A and the internal tapered surfaces 11 of the housing support brackets 11 are arranged to be mutually non-locking and they function by providing relatively rotatable surfaces which, by urging the tapers together, have no radial or axial free play.

The tapered parts are urged together by providing two sprag washers 12, respectively, which are designed to act as springs. Each sprag washer 12 is a simple press fit over parallel trunnion extensions of its respective trunnion 9A adjacent its outer end, where it protrudes through an aperture in the female part 11A. Each washer 12 is pressed on to its trunnion 9A with a preset load. Thus, the male and female parts are resiliently pushed towards one another by the washers 12 and the spring action of the washers 12 takes up any wear at the tapered surfaces so that the clearance is eliminated by the spring action, while allowing relative rotation.

It will be appreciated that the present pivot mechanism is easy to assemble, since the housing support bracket 11 is simply located on their trunnions and then the washers 12 are located with a preset load. Only a small number of components are required and the result achieves good wear tolerance and no noticeable looseness or free play.

Having described the invention, what is claimed is:

1. A pivot mechanism having means to take up wear between two parts of the mechanism which move relatively to one another, the means comprising:
a male tapered part nesting in a corresponding female part, one of the two parts being resiliently biased towards the other, one of said parts is a housing to support a shaft or a shaft support bearing; and
said shaft or shaft support bearing forms part of a car steering column.

2. A mechanism according to claim 1, wherein said male tapered part comprises a tapered trunnion.

3. A mechanism according to claim 2, wherein said tapered trunnion forms part of said housing.

4. A mechanism according to claim 1, wherein one of said two parts is resiliently loaded towards the other by means of a spring washer which is secured to the other of the two parts.

5. A mechanism according to claim 4, wherein said tapered trunnion passes through an aperture provided by the female part and said washer is secured to a part of said trunnion which lies on the side of said aperture remote from the main body of said housing, thereby acting to bias the two parts toward one another.

6. A mechanism according to claim 1, wherein said means includes two of said male tapered parts nesting in corresponding female parts, the respective pairs of male and female parts being symmetrically opposed to one another.

7. A mechanism according to claim 1, wherein said female part is part of a support bracket for said housing.

8. A pivot mechanism having means to take up wear between two parts of the mechanism which move relatively to one another, the means comprising:
 a male tapered part nesting in a corresponding female part, one of the two parts being resiliently biased towards the other, one of said parts is a housing to support a shaft or a shaft support bearing; and
 said female part is part of a support bracket for said housing.

9. A mechanism according to claim 8, wherein said shaft or shaft support bearing forms part of a car steering column.

10. A mechanism according to claim 8, wherein said male tapered part comprises a tapered trunnion.

11. A mechanism according to claim 10, wherein said tapered trunnion forms part of said housing.

12. A mechanism according to claim 8, wherein one of said two parts is resiliently loaded towards the other by means of a spring washer which is secured to the other of the two parts.

13. A mechanism according to claim 12, wherein said tapered trunnion passes through an aperture provided by the female part and said washer is secured to a part of said trunnion which lies on the side of said aperture remote from the main body of said housing, thereby acting to bias the two parts toward one another.

14. A mechanism according to claim 8, wherein said means includes two of said male tapered parts nesting in corresponding female parts, the respective pairs of male and female parts being symmetrically opposed to one another.

15. A pivot mechanism for use with a shaft comprising:
 a housing for supporting the shaft;
 a female part;
 a tapered male trunnion attached to the housing, the male trunnion nesting in the female part, the female part has an aperture and the male trunnion extends through the aperture; and
 a biasing means for biasing the female part and the main trunnion one towards the other.

16. A pivot mechanism according to claim 15 wherein the biasing means is a spring washer and is located on a portion of the male trunnion which extends beyond the aperture on the female part.

17. A pivot mechanism for use with a shaft comprising:
 a housing for supporting the shaft;
 a female part;
 a tapered male trunnion attached to the housing, the male trunnion nesting in the female part, the number of female parts is two, the number of corresponding male trunnions is two and the respective pairs of female parts and male trunnions are symmetrically opposed to one another; and
 a biasing means for biasing the female part and the male trunnion one towards the other.

18. A pivot mechanism for use with a shaft comprising:
 a housing for supporting the shaft;
 a female part;
 a tapered male trunnion attached to the housing, the male trunnion nesting in the female part, the male trunnion has a frusto conical shape; and
 a biasing means for biasing the female part and the male trunnion one towards the other.

19. A pivot mechanism for use with a shaft comprising:
 a housing for supporting the shaft;
 a pair of support brackets, each bracket having a female part, the female part having an aperture;
 a pair of male trunnions attached to the housing, the male trunnions nesting in corresponding female parts, the respective pairs of the male trunnions and female parts being symmetrically opposed to one another; and
 a biasing means for biasing the female part and the male trunnion one towards the other, the biasing means is a spring washer and is located on a portion of the male trunnion which extends through the aperture on the female part.

20. A pivot mechanism for use with a shaft comprising:
 a housing for supporting the shaft;
 a pair of support brackets, each bracket having a female part, the female part having an aperture;
 a pair of male trunnions attached to the housing, the male trunnions nesting in corresponding female parts, the respective pairs of male trunnions and female parts being symmetrically opposed to one another, each male trunnion has a frusto conical shape; and
 a biasing means for biasing the female part and the male trunnion one towards the other.

* * * * *